United States Patent [19]

Curtis et al.

[11] Patent Number: 4,475,198
[45] Date of Patent: Oct. 2, 1984

[54] LASER SYSTEM

[75] Inventors: Earl C. Curtis, Topanga; Gary F. Morr, Thousand Oaks, both of Calif.

[73] Assignee: Rockwell International Corporation, El Segundo, Calif.

[21] Appl. No.: 350,708

[22] Filed: Feb. 22, 1982

[51] Int. Cl.³ .............................................. H01S 3/10
[52] U.S. Cl. ........................................ 372/23; 372/89; 372/92; 372/19; 372/20; 372/97; 372/32
[58] Field of Search ...................... 372/89, 55, 97, 92, 372/19, 57, 99, 23, 31, 32; 239/555

[56] References Cited

U.S. PATENT DOCUMENTS 4,072,858 2/1978 Stone ...................................... 372/31

Primary Examiner—William L. Sikes
Assistant Examiner—Lëon Scott, Jr.
Attorney, Agent, or Firm—H. Fredrick Hamann; Harry B. Field

[57] ABSTRACT

There is provided a gain medium capable of radiating spectral lines differing in intensity as a function of position along a selected, gain-medium axis. A first resonator is arranged along a first optical axis that crosses the gain medium in a first region along the selected, gain-medium axis; the first resonator is adapted to establish a first optical mode that selectively lases one group of the spectral lines of the gain medium, namely a group thereof having high intensity within the volume in which the first mode is established. A second resonator is arranged along a second optical axis that crosses the gain medium in a second region along the selected, gain-medium axis; the second resonator is adapted to establish a second optical mode that lases a second group of spectral lines differing at least in part, from the first group. The second group of spectral lines has high intensity within the volume in which the second mode is established. The laser energy from the first and second resonators is outcoupled onto a target. In the case of a gas transport laser, the first resonator is adapted to lase a group of spectral lines having a higher frequency than the second resonator.

11 Claims, 5 Drawing Figures

A

B

C

4,475,198

LASER SYSTEM

BACKGROUND OF THE INVENTION

This invention relates to lasers and, more particularly, to a laser system for generating high-intensity, broad-band, light energy.

In some lasers, notably a gas transport laser, the gain medium is capable of radiating spectral lines differing in intensity as a function of position along an axis transverse to the optical axis of the laser. Thus, in a chemical laser for example, wherein the gain medium is hydrogen and fluorine, the gas becomes hotter as it moves downstream from the nozzle bank and undergoes relaxation. Accordingly, the resonator of the laser establishes an optical mode that lases spectral lines of less than optimum intensity in part or most of the gain medium.

SUMMARY OF THE INVENTION

According to the invention, a plurality of optical modes are established in a laser gain medium so as to optimize the spectral lines that are lased thereby. Specifically, there is provided a gain medium capable of radiating spectral lines differing in intensity as a function of position along a given axis. A first resonator is arranged along a first optical axis that crosses the gain medium in a first region aong the given axis; the first resonator is adapted to establish a first optical mode that selectively lases one group of the spectral lines of the gain medium, namely a group thereof having high intensity within the volume in which the first mode is established. A second resonator is arranged along a second optical axis that crosses the gain medium in a second region along the given axis; the second resonator is adapted to establish a second optical mode that lases a second group of spectral lines differing at least in part, from the first group. The second group of spectral lines has high intensity within the volume in which the second mode is established. The laser energy from the first and second resonators is outcoupled onto a target. In the case of a gas transport laser, the first resonator is adapted to lase a group of spectral lines having a higher frequency than the second resonator.

BRIEF DESCRIPTION OF THE DRAWINGS

The features of a specific embodiment of the best mode contemplated of carrying out the invention are illustrated in the drawings, in which:

DETAILED DESCRIPTION OF THE SPECIFIC EMBODIMENT in FIGS. 2 and 3, an elongated rectangular gain medium region 10 extends along a longitudinal axis 12. By way of example, gain medium 10 could comprise an energized mixture of hydrogen and fluorine. In such case, gain medium 10 would be produced by a bank of nozzles 14 having outlets directed to eject gas parallel to axis 12, which is an axis of the region 10 in line with the gas-flow direction. Fluorine atoms formed by combustion and a diluent escape through some of the nozzles; hydrogen molecules escape through the remaining nozzles. The nozzles reduce the temperature and pressure of the fluorine atoms and mix the fluorine atoms with the hydrogen to form gain medium 10. In FIG. 1, spectrum diagrams A, B, and C represent the lines that gain medium 10 is capable of radiating at three different positions along axis 12. In each case, the height of the line represents intensity and the lateral position of the line represents the rotational quantum number, J, which is proportional to frequency. At each position, spectral lines are generally from a change in state from a vibrational quantum number two to one and from a vibrational quantum number one to zero. Spectrum diagram A represents the lines radiated by gain medium 10 closest to nozzles 14 and spectrum diagram C represents the lines radiated by gain medium 10 farthest from nozzles 14.

Separate optical modes are established in different regions of gain medium 10 by three different optical resonators so as to selectively lase those groups of spectral lines that are of highest intensity within the volume contained in such modes. In this way, the total radiation from gain medium 10 can be optimized.

As the gain medium leaves the gas source and travels through the gain medium region, the excited states of the atoms invariably decay. Rotational levels that have highest gain initially have absorption a short distance from the source while rotational levels of higher J number that have low gain initially have the highest gain some distance from the source. (This was described by C. K. N. Patel, Phys. Rev. Lett. 12, 588, for the $CO_2$ laser and is a consequence of the Boltzmann law for energy distribution.) The spectral-line intensities of the resonators thus are a function of the gain distribution of the medium which is dependent on the position of the resonator optical axis along the longitudinal axis 12 of the gain medium.

Figure 1:
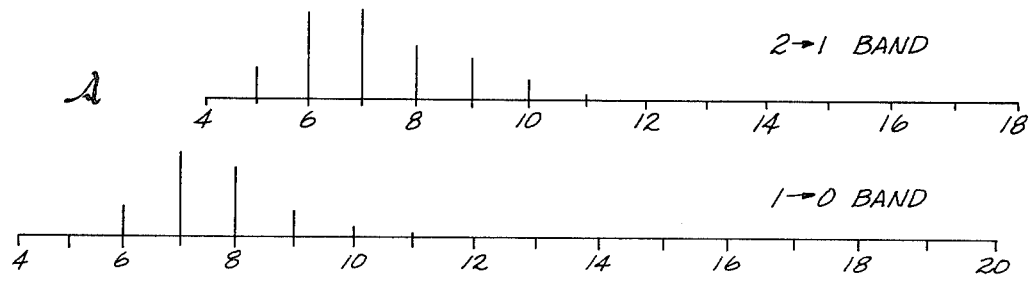
FIG. 1 illustrates diagrams of spectral lines radiated by the gain medium of a typical gas transport laser.
Figure 1:
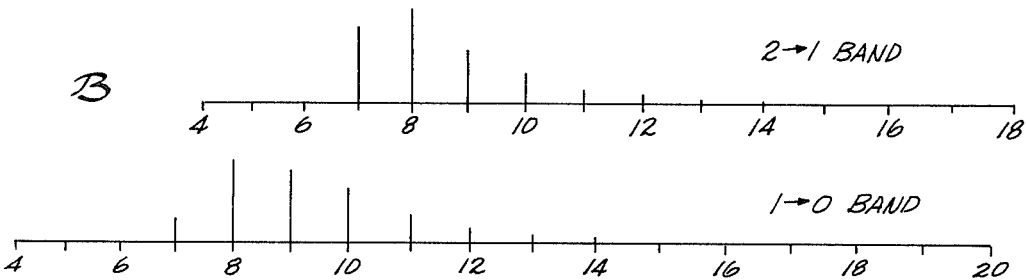
Figure 1:
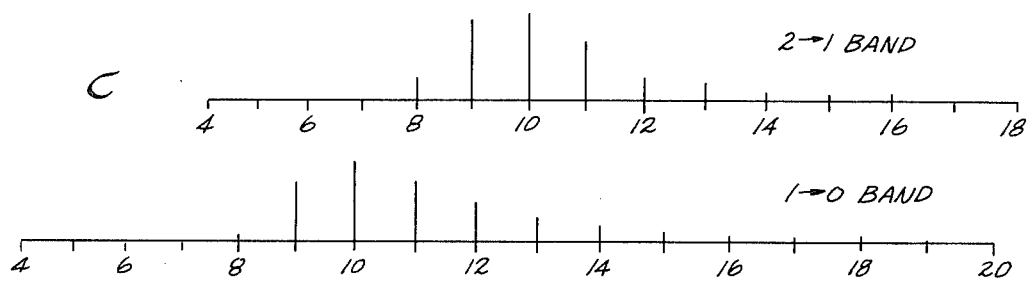
Figure 2:
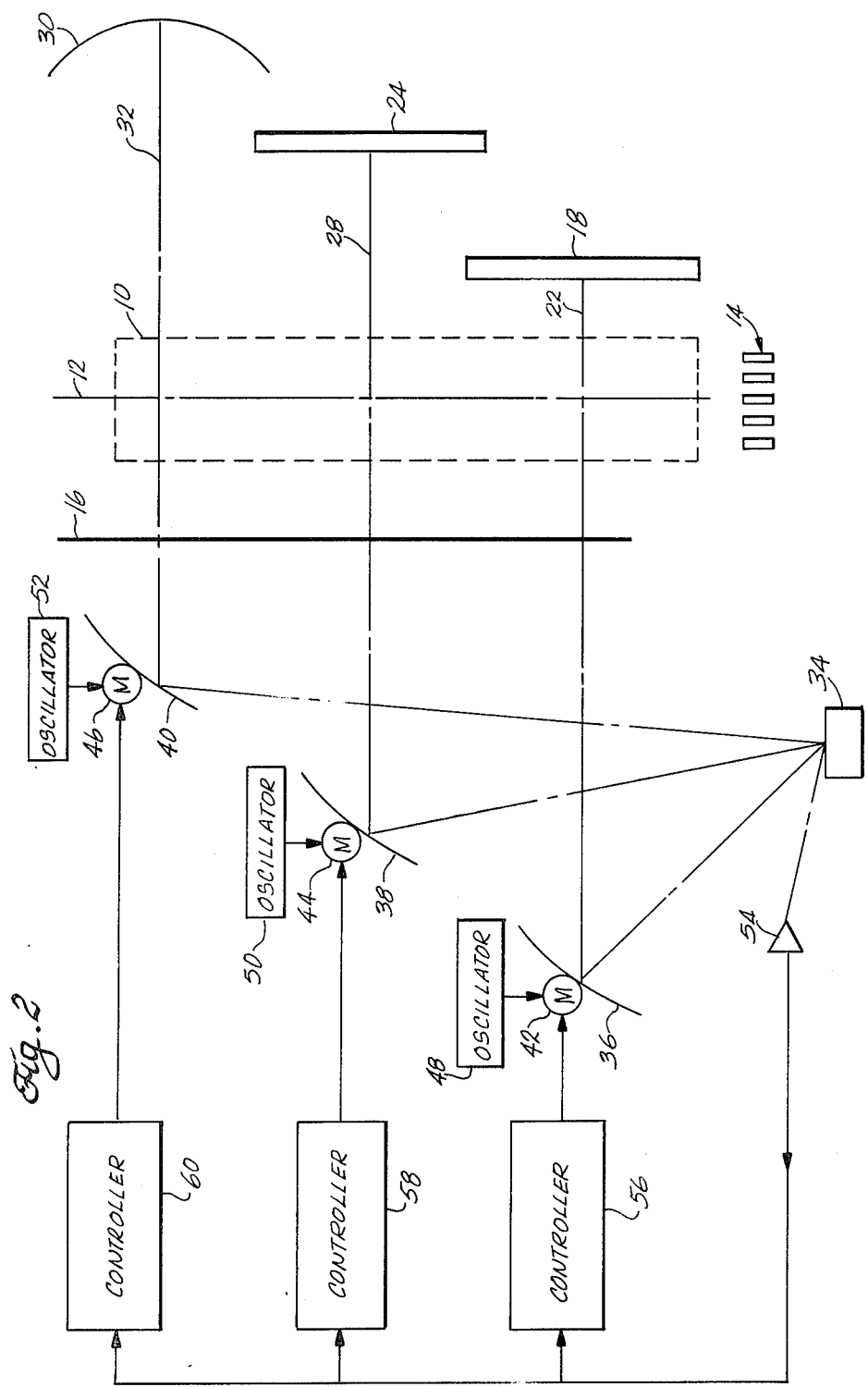
FIG. 2 is a schematic top view of a laser system incorporating principles of the invention.
Figure 3:
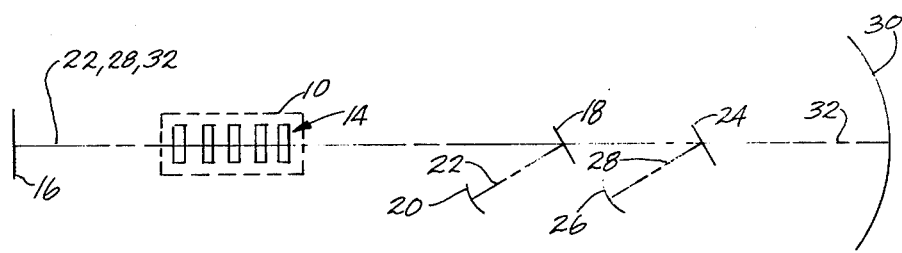
FIG. 3 is a schematic front view of a portion of the system of FIG. 2.

A partially light transmissive planar reflector 16 lies on one side of gain medium 10 and extends along its entire length parallel to axis 12. One mode is established by a resonator comprising a planar reflector 18 and a spherical reflector 20 in combination with part of reflector 16. This resonator is arranged on an optical axis 22 that lies perpendicular to axis 12. In this mode, light energy is reflected between reflector 20 and reflector 16 via reflector 18 and is outcoupled by transmission through reflector 16 and the highest intensity lines of spectrum diagram A are selectively lased. The center of spherical reflector 20 lies on optical axis 22 outside of the resonator, i.e., to the left of reflector 16 in FIG. 2.

Another mode is established by a resonator comprising a planar reflector 24 and a spherical reflector 26 in combination with part of reflector 16. This resonator is arranged on an optical axis 28 that lies perpendicular to axis 12. In this mode, light energy is reflected between reflector 26 and reflector 16 via reflector 18 and is outcoupled by transmission through reflector 16 and the highest intensity lines of spectrum diagram B are selectively lased. The center of spherical reflector 26 lies on optical axis 28 outside of the resonator, i.e., to the left of reflector 16 in FIG. 2.

Still another mode is established by a resonator comprising a spherical reflector 30 in combination with part of reflector 16. This resonator is arranged on an optical axis 32 that lies perpendicular to axis 12. In this mode, light energy is reflected directly between reflector 30 and reflector 16 and is outcoupled by transmission through reflector 16 while the highest intensity lines of spectrum diagram C are selectively lased. The center of spherical reflector 30 lies on optical axis 32 outside of the resonator, i.e., to the left of reflector 16 in FIG. 2.

The projections of reflectors 18, 24, and 30 onto reflector 16 overlap so the entire length of gain medium 10 is encompassed thereby. Reflector 24 is further from reflector 16 than reflector 18, and reflector 30 is further from reflector 16 than reflector 24. Similarly, reflector 20 is nearer to reflector 16 than reflector 26, and reflector 26 is nearer to reflector 16 than reflector 30. The resultant distance between reflectors 16 and 26 along optical axis 28 is greater than the resultant distance between reflectors 16 and 20 along optical axis 22, and the resultant distance between reflectors 16 and 30 along optical axis 32 is greater than the resultant distance between reflectors 16 and 26 along optical axis 28.

Beyond reflector 16, i.e., to the left thereof (FIG. 2) the outcoupled energy is combined and directed at a target 34 by means of pivotally supported reflectors 36, 38, and 40, which are aligned with optical axes 22, 28, and 32, respectively. By way of example, target 34 could comprise a workpiece to be welded or other similar laser energy utilizing means. Assuming target 34 is movable, reflectors 36, 38, and 40 are rotatably driven by motors 42, 44, and 46, respectively, so as to track target 34 automatically. The outputs of oscillators 48, 50, and 52, which generate electrical signals in the kilohertz rage, are applied to motors 42, 44, and 46, respectively, to dither reflectors 36, 38, and 40, respectively. The amplitude of such dither is small relative to the size of target 34 so that it does not adversely affect the coupling of light energy thereto. A small part of the light energy from reflectors 36, 38, and 40 is reflected by target 34 and sensed by a light detector 54, which is coupled to reflector controllers 56, 58, and 60. By means of filtering, reflector controllers 56, 58, and 60 distinguish between the light energy from reflectors 36, 38, and 40, respectively, and control motors 42, 44, and 46, respectively, to orient reflectors 36, 38, and 40, respectively, so as to optimize the energy directed thereby onto target 34 as it moves. Typically, controllers 56, 58, and 60 each include a filter for selectively transmitting the frequency of the associated oscillator and a rectifier for generating a control signal to operate the associated motor.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, more or fewer modes could be established in the gain medium. Rather than being stable resonators as shown, the resonators could be unstable. In general, the invention is applicable to any gain medium capable of radiating spectral lines differing in intensity as a function of position along a given axis. Thus, in addition to gas transport lasers, the invention is also applicable, for example, to a laser pumped by an electron beam having spatially variable intensity. Although use of reflectors 18 and 24 to fold or turn optical axes 22 and 28, respectively, is preferred so as to facilitate the construction and size of reflectors 20 and 26, reflectors 18 and 24 could be eliminated, in which case reflectors 20 and 26 would be positioned to face reflector 16.

What is claimed is:

1. A laser system comprising:
   - a gain medium capable of generating spectral lines differing in intensity as a function of position along a selected axis, which is an axis of the region occupied by the gain medium;
   - a first resonator arranged along a first optical axis that crosses the gain medium in a first region perpendicular to the selected axis, the first resonator selectively lasing a first group of the spectral lines of the gain medium;
   - a second resonator arranged along a second optical axis that crosses the gain medium at a second region perpendicular to the selected axis, the second resonator selectively lasing a second group of spectral lines differing at least in part from the first group; and
   - means for outcoupling laser energy from the first and second resonators.

2. The laser system of claim 1, in which the outcoupling means includes means for combining laser energy from the first and second resonators.

3. The laser of system of claim 2, in which the first resonator comprises outcoupling means on one side of the gain medium for planarly reflecting at least part of the light incident upon a selected plane perpendicularly crossing the first optical axis back along the first optical axis toward the gain medium, a planar reflector on the other side of the gain medium intersecting the first optical axis at an acute angle, and a spherical reflector having a center lying on a line normal to the planar reflector.

4. The laser system of claim 3, in which the outcoupling means includes means for transmitting part of the light incident upon the selected plane.

5. The laser system of claim 3, in which the outcoupling means includes means for transmitting part of the light incident upon the selected plane, the system additionally comprising a spherical reflector on the other side of the gain medium intersecting the selected axis so its center lies parallel to the first optical axis and faces the selected plane.

6. The laser system of claim 1, in which the gain medium comprises excited-state gas injected into the gain medium region from a gas source, the injected gas traveling along the selected axis such that spectral lines having the largest intensity vary in frequency as a function of distance of a resonator's optical axis from the source along the selected axis, the first resonator being nearer to the source than the second resonator, and the first resonator lasing a group of spectral lines having a higher frequency than the second resonator.

7. The laser system of claim 1, in which each resonator comprises outcoupling means on one side of the gain medium for planarly reflecting at least part of the light incident upon a selected plane perpendicularly crossing the first optical axis back along the first optical axis toward the gain medium, a planar reflector on the other side of the gain medium intersecting the first optical axis at an acute angle, and a spherical reflector having a center lying on a line normal to the planar reflector.

8. The laser system of claim 7, in which the outcoupling means includes means for transmitting part of the light incident upon the selected plane, the plane reflector of the second resonator being farther from the gain medium than that of the first resonator.

9. The laser system of claim 1, in which the outcoupling means includes a first reflector aligned with the first optical axis, a second reflector aligned with the second optical axis and means for orienting the first and second reflectors to direct energy from the first and second resonators to a target.

10. The laser system of claim 9, in which the orienting means comprises means for dithering the first and second reflectors at different frequencies, means for detecting light reflected from the target, and means responsive to the detecting means for individually orienting the first and second reflectors to optimize the light energy directed thereby onto the common region.

11. A method for producing light energy comprising the steps of:
   providing a gain medium capable of generating spectral lines differing in intensity as a function of position along a selected axis which is an axis of the region occupied by the gain medium;
   establishing a first resonant mode along a first optical axis that crosses the gain medium in a first region along the selected axis, the first mode lasing a first group of spectral lines of the gain medium;
   establishing a second resonant mode arranged along a second optical axis that crosses the gain medium at a second region along the selected axis, the second mode lasing a second group of spectral lines of the gain medium differing at least in part from the first group; and
   directing light energy from the first and second modes to a common target.

* * * * *